United States Patent [19]
Ostrowski

[11] Patent Number: 5,379,405
[45] Date of Patent: Jan. 3, 1995

[54] SCSI CONVERTER WITH SIMPLE LOGIC CIRCUIT ARBITRATION FOR PROVIDING BILATERAL CONVERSION BETWEEN SINGLE ENDED SIGNALS AND DIFFERENTIAL SIGNALS

[75] Inventor: Carl L. Ostrowski, Ann Arbor, Mich.

[73] Assignee: Unisys Corporation, Blue Bell, Pa.

[21] Appl. No.: 121,395

[22] Filed: Sep. 15, 1993

[51] Int. Cl.[6] ............................................. G06F 13/14
[52] U.S. Cl. ................................ 395/500; 395/325; 340/825.5
[58] Field of Search ............ 395/250, 325, 500; 340/825.5; 370/85.1

[56] References Cited

U.S. PATENT DOCUMENTS

| | | | |
|---|---|---|---|
| 4,716,523 | 12/1987 | Gilanyi et al. | 395/250 |
| 4,864,291 | 9/1989 | Korpi | 340/825.5 |
| 4,979,095 | 12/1990 | Ghaffari | 395/325 |
| 5,220,286 | 6/1993 | Nadeem | 330/9 |
| 5,243,623 | 9/1993 | Murdock | 375/7 |
| 5,264,958 | 11/1993 | Johnson | 395/325 |

*Primary Examiner*—Parshotam S. Lall
*Assistant Examiner*—Viet Vu
*Attorney, Agent, or Firm*—J. Ronald Richebourg; Mark T. Starr; Stanton D. Weinstein

[57] ABSTRACT

The disclosed invention is a unique apparatus for converting signal formats. For example, the apparatus can convert from a single-ended to a differential format without the necessity of additional control circuitry. A cross-circuit arrangement prevents an undesired reversal of direction for conversion of signal formats.

4 Claims, 5 Drawing Sheets

5,379,405

1

SCSI CONVERTER WITH SIMPLE LOGIC CIRCUIT ARBITRATION FOR PROVIDING BILATERAL CONVERSION BETWEEN SINGLE ENDED SIGNALS AND DIFFERENTIAL SIGNALS

FIELD OF THE INVENTION

The disclosed invention relates to the field of peripheral devices and more particularly to circuitry for converting signals from one format to the other.

BACKGROUND OF THE INVENTION

In the art of computer technology, it is typical to employ peripheral devices that use a common signal format for transmitting data to and from a host computer. Or, if a device using a different format were used, an elaborate circuit scheme was used to convert from one format (e.g., differential) to another (such as single-ended). Such prior art circuitry was expensive and slow.

To meet the requirements for SCSI (Small Computer System Interface), high performance and simplicity of the peripheral devices are paramount. The widespread and growing acceptance of SCSI is largely a function of the combination of simplicity and the functionality it offers. SCSI is a bus architecture, and as such dictates a set of standard signal protocols. A bus can support up to eight separate addresses. The architecture allows for multiple host connections and peripheral devices to coexist on the same bus. With one host connected to the bus, the remaining seven addresses can be used to attach up to seven peripheral devices.

Most peripheral interfaces support a master/slave relationship, with the host as the master and the peripheral as the slave. This arrangement is satisfactory in the high end of the market where the complex disk subsystems include multiple controllers, multiple ports and multiple paths. However, these sophisticated devices are cost-prohibitive in the entry/medium computer system marketplace. SCSI can provide substantial functionality in this area because of its peer-to-peer design. Any device attached to a SCSI bus may either assume the role of the requestor of services or the supplier of services. A device may change its role whenever required. During any particular transaction the device requesting the service is called the initiator, while the device requested to provide the service is called the target. When two or more hosts are attached to a common bus, each has visibility to any attached peripheral.

All SCSI commands are high-level logical commands. This removes the requirement for initiators to "understand" the detailed operation of the targets. All bus data transfers are independent of the timing constraints of the peripheral devices. Data is transferred from the device buffers at bus speed rather than device speed.

From the foregoing it can be seen that in a system employing peripheral devices having different signal formats, circuitry will be required to convert back and forth between formats at a high rate of speed.

BRIEF SUMMARY OF THE INVENTION

The disclosed invention is an apparatus for converting from one signal format to another, such as, converting from a single-ended format to a differential format. The apparatus is capable of converting in either direction, such as from differential to single-ended or vice versa. The apparatus comprises a driver/receiver means disposed for detecting the presence of a single-ended signal; a differential transceiver means disposed for detecting the presence of a differential signal; a first binary cell having an output coupled to an enable input terminal of the driver/receiver means; a second binary cell having an output coupled to an enable input terminal of the transceiver means; a first gating means responsive to both the single-ended signal and the differential signal for setting/resetting the first binary cell. The first gating means further includes a first circuit means responsive to said single-ended signal and being adapted to set the first binary cell when a single-ended signal is detected by the driver/receiver means. Also, a second gating means is provided which is responsive to both the single-ended signal and the differential signal for setting/resetting the second binary cell. The second gating means further includes a third circuit means responsive to the differential signal and being adapted to reset the first binary cell when a differential signal is detected by the transceiver means; and, a fourth circuit means responsive to the single-ended signal and being adapted to reset the second binary cell when a single-ended signal is detected by the driver/receiver means.

Art advantage of the apparatus of the present invention is the provision of unique circuitry that allows transition from converting single-ended signals to differential signals to converting differential signals to single-ended signals without delay and additional control circuitry.

A feature of the present invention resides in the provision of cross-coupled circuitry that locks into converting signals in one direction until complete before allowing a transition to the other direction.

DETAILED DESCRIPTION

Figure 1:
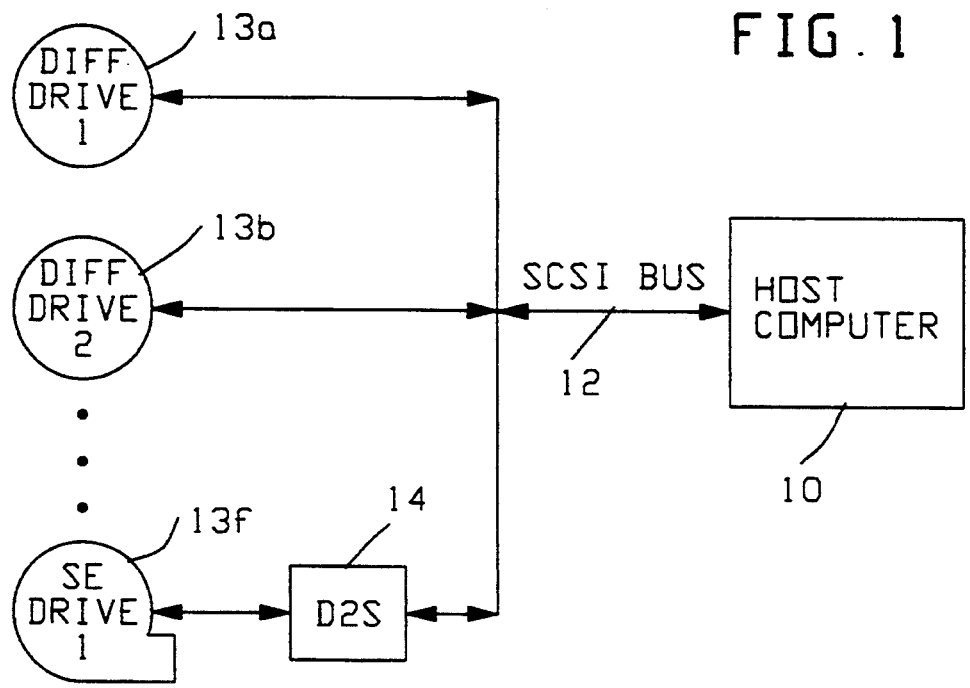
FIG. 1 is a general block diagram of a series of peripheral devices linked to a host computer by means of the circuitry of the present invention.

Referring now to the drawings, and to FIG. 1 in particular, a host computer 10 is coupled to a SCSI bus 12, which in the disclosed embodiment transmit and receive signals in a differential format. Also, a plurality of peripheral devices 13a–13f are coupled to the same SCSI bus. However, in the disclosed embodiment, device 13f is a single-ended device such as a tape drive. To convert between the signal formats of single-ended and differential converter 14 is disposed between the device 13f and the SCSI bus 12.

Most peripheral devices, especially the more expensive types, transmit data and control signals in a differential format. That is, two separate signal lines are used to transmit both the signal and it's polar complement. On the other hand, some peripheral devices, such as a CD-ROM or inexpensive tape drives, transmit in a single-ended format. The single-ended format requires only a single line to transmit voltage variations between, e.g., 0 volts and +5 volts. If a combination of peripheral devices are used in the same system, or where connection is made to a SCSI bus which employs differential signal format only, then a conversion must be made between these signal formats.

The circuit block 14 FIG.1 (also labeled "D2S", which is shorthand for "differential to single-ended") performs the conversion function between the signal formats discussed above.

For background purposes, the signals transmitted on the SCSI bus 12 are as follows:

ACK(ACKNOWLEDGE): Driven by the Initiator to acknowledge an Information transfer.

ATN(ATTENTION): Driven by the Initiator when connected to get the Target's attention for sending a MESSAGE OUT.

BSY(BUS BUSY): Indicates that the SCSI Bus is in use. Also, used to gain control of the Bus.

C/D(COMMAND OR DATA): Driven by the Target to indicate the Bus Phase. In general, it indicates whether data or "other information" is being transferred.

DB(7-0) (DATA BUS): Driven by either device, as determined by the state of the I/O signal. Contains the data that is sent from one device to the other during an Information Transfer.

DB(P) (DATA BUS PARITY): Driven by either device. Contains the parity bit for the data that is sent on DB (0-7) from one device to the other during Information Transfer.

I/O (INPUT OR OUTPUT): Driven by the Target to indicate the Bus Phase. In general, I/O indicates the bus information transfer direction. I/O also determines the SELECTION and RESELECTION phases. "True/Asserted" indicates the direction from the Target to the Initiator.

MSG (MESSAGE PHASE): Driven by the Target to indicate the Bus Phase. In general, indicates whether the "other" information alluded to under C/D is a MESSAGE IN, MESSAGE OUT, COMMAND, or STATUS information.

REQ (REQUEST): Driven by the Target to request an Information Transfer.

RST (BUS RESET): Driven by any device to clear all devices from the bus. May cause "power on reset" type condition on many devices.

SEL (SELECT DEVICE): Driven by: (1) an Initiator to select a Target; or, (2) a Target to reselect an Initiator.

Figure 2:
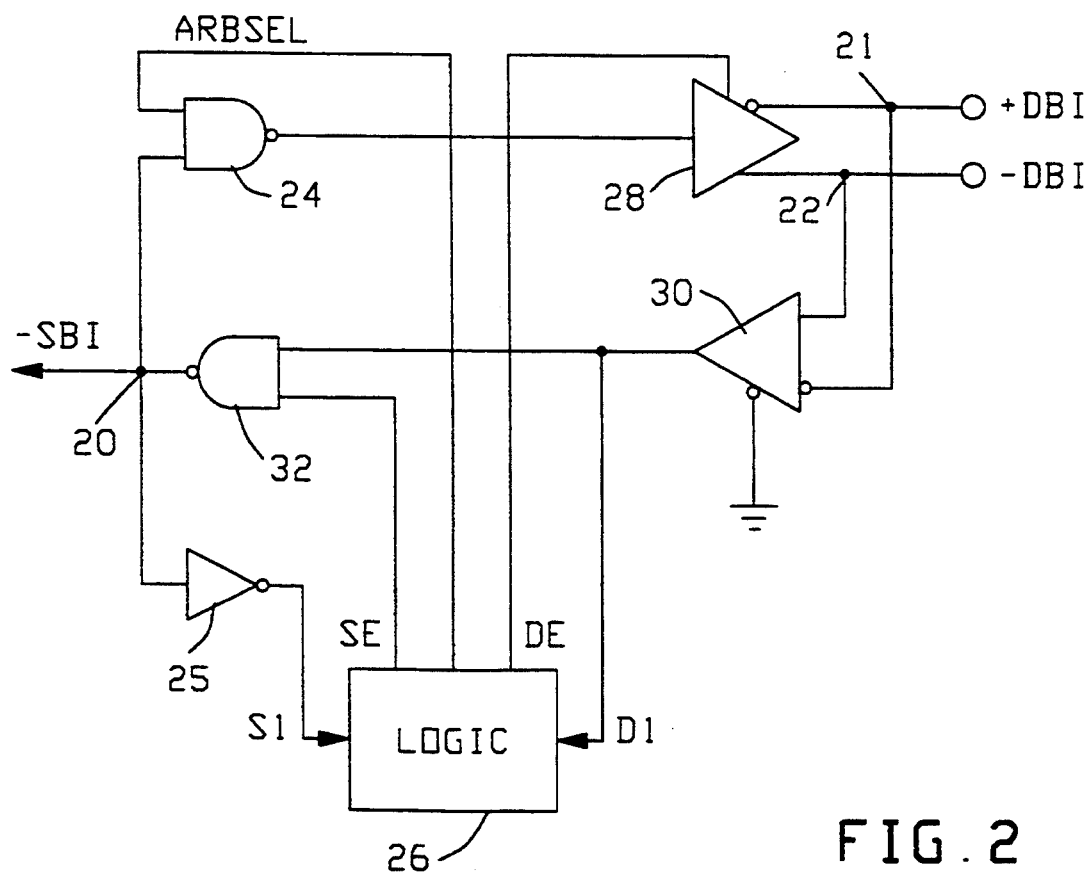
FIG. 2 is a block-schematic diagram of the converter circuitry of the present invention.

Referring now to FIG. 2, a block-logic diagram of circuit 14 is shown in detail. A single-ended signal (denoted herein as "SB1") is applied on a node 20, and a differential signal (denoted herein as "+DB1" and "−DB1") is applied on nodes 21 and 22.

If a single-ended signal is applied to the node 20, then this signal is supplied to one of two inputs of a NAND gate 24 and to the input of an inverter 25. The output of the inverter 25, which is denoted as S1, is coupled to an input of logic 26. As will be shown in greater detail hereinafter, an ARBSEL (ARBITRATION SELECT) signal from the logic 26 enables the NAND gate 24 to pass the SB1 signal through to an amplifier 28 having outputs coupled to the nodes 21 and 22. Another output signal "DE" (DIFFERENTIAL ENABLE) is coupled from the logic 26 to an enabling input of the amplifier 28. Thus, the single-ended signal SB1 is converted to a differential signal and supplied on the nodes 21 and 22, which are coupled to the SCSI bus.

A differential signal, +DB1/−DB1, applied to the nodes 21 and 22 from the SCSI bus are coupled to input terminals of an amplifier 30. The enable input of the amplifier 30 is coupled to ground potential, which makes the amplifier always enabled. Hence, the differential signal appears at the output of the amplifier 30 and is labeled herein as "D1". The D1 signal is applied to another input terminal of the logic 26, and as will be shown hereafter, generates a single-ended enable signal "SE". The SE signal is coupled to one of two inputs of a NAND gate 32. The second input of the NAND gate 32 is coupled to the output of the amplifier 30. Thus, when the SE signal enables the NAND gate 32, the D1 signal is passed through to the node 20 thereby being converted to a single-ended signal.

Figure 3:
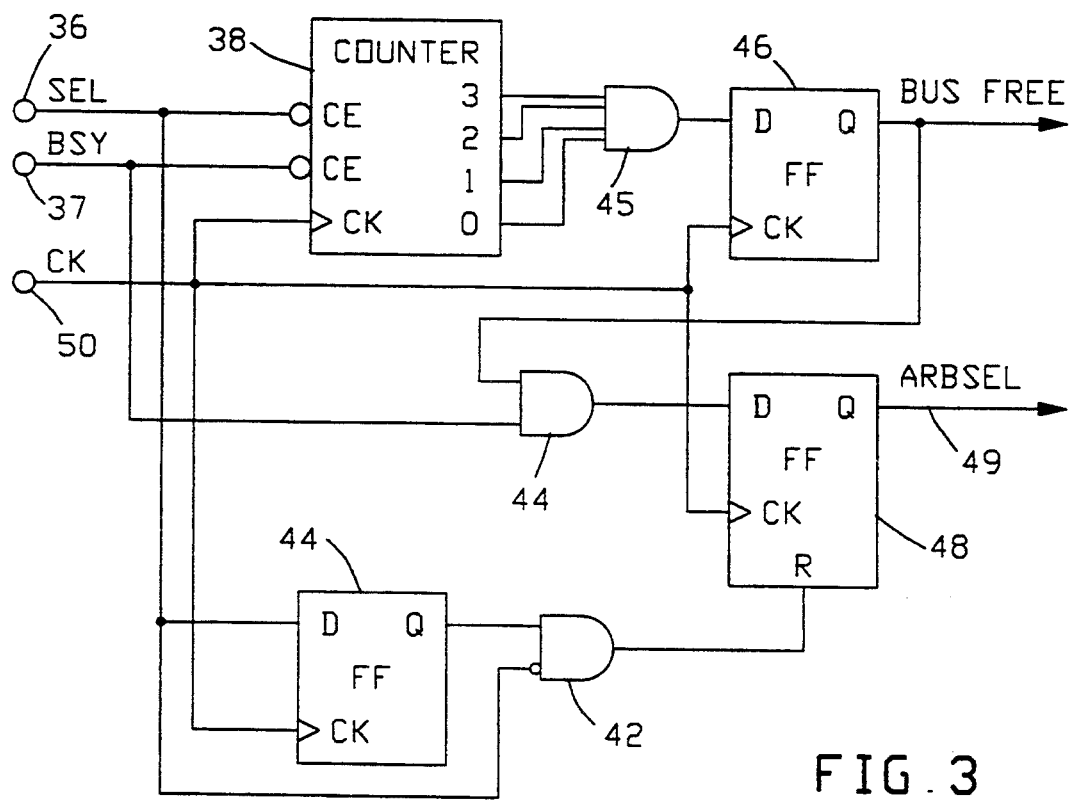
FIG. 3 is a logic diagram of the arbitrator-select circuitry of the present invention.

Prior to an explanation of how the conversion is accomplished, reference is made to FIG. 3 wherein a logic diagram is shown for generation of the ARBSEL signal. The SEL and BSY signals from the SCSI bus are applied to nodes 36 and 37, respectively. The node 36 is coupled to an enable input terminal of a counter 38, to a D input terminal of a flip-flop 40 and to one of two input terminals of an AND gate 42. The node 37 is coupled to a second enable input terminal of the counter 38 and to one of two input terminals of an AND gate 44. The 0-3 output terminals of the counter 38 are coupled respectively to four input terminals of an AND gate 45. The output of the AND gate 45 is coupled to the D input terminal of a flip-flop 46.

The output of the flip-flop 46 supplies the signal denoted as BUS FREE, and is coupled to the second input terminal of the AND gate 44. The output of the AND gate 44 is coupled to the D input terminal of a flip-flop 48. A clock ("CK") signal is applied to a node 50, which is coupled to the CK input terminals of the counter 38, and to the flip-flops 40, 46 and 48. It is the function of the counter 38, the AND gate 45 and the flip-flop 46 to provide a time delay of approximately 800 nanoseconds to detect that the bus is free. Hence, the next action on the bus will be a SELECT or RESELECT followed by a determination of what operation is to be performed.

The output of the flip-flop 40 is coupled to the second input terminal of the AND gate 42, and the output of the AND gate 42 is coupled to the reset "R" input terminal of the flip-flop 48. The output of the flip-flop 48 is coupled to a line 49, which transmits the ARBSEL signal. The ARBSEL signal defines a window of time in which the conversion can take place.

Figure 4:
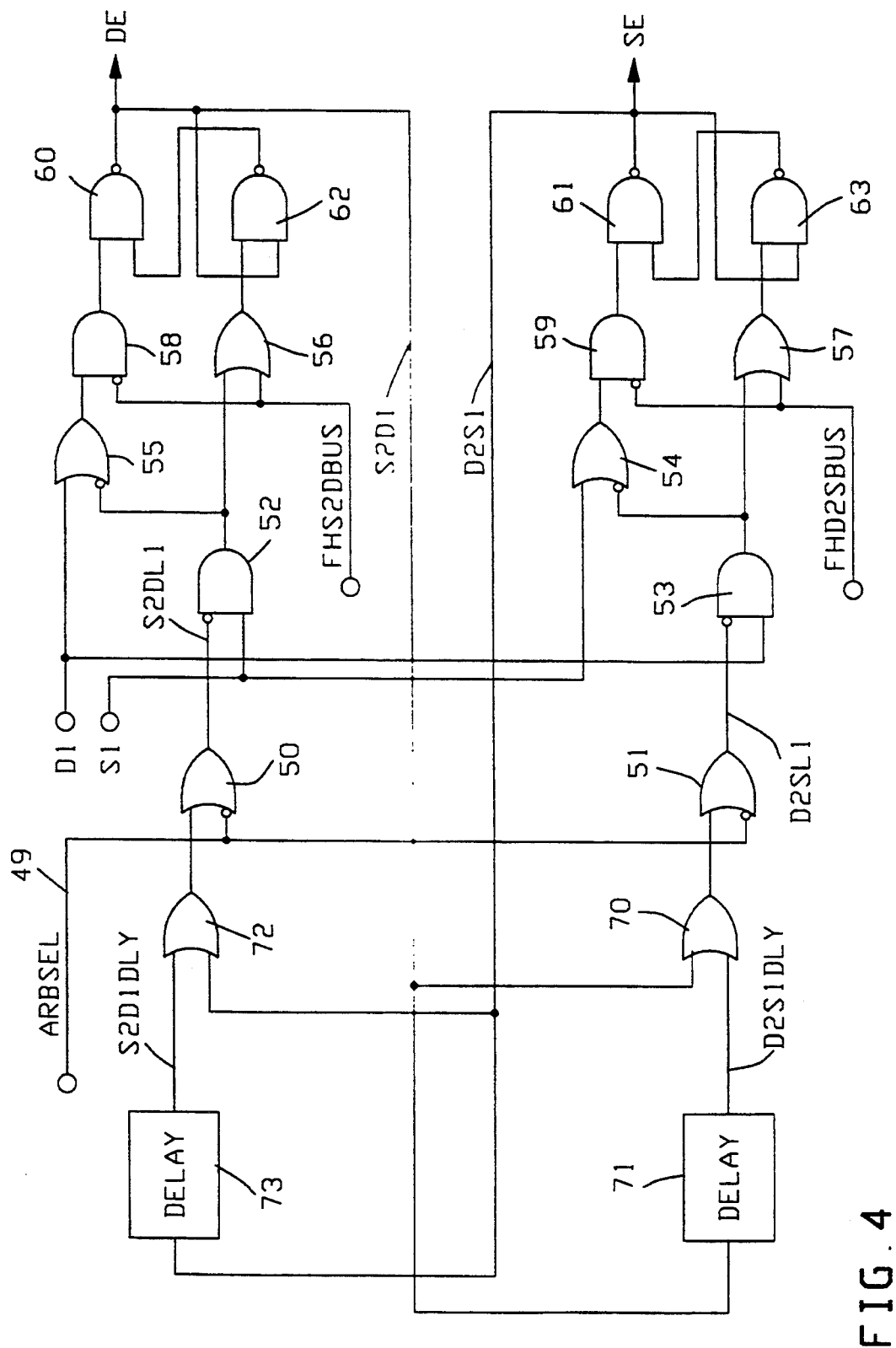
FIG. 4 is a detailed logic diagram of the converter circuit of this invention.

Referring now to FIG. 4, a detailed logic diagram of the conversion circuit is shown. The ARBSEL signal is applied to inverting input terminals of OR gates 50 and 51. The output of the OR gate 50 in coupled to an inverting input of an AND gate 52, and in a similar manner, the output of the OR gate 51 is coupled to an inverting input of an AND gate 53. The S1 signal from the inverter 25 (FIG. 2) is coupled to the second input of the AND gate 52 and to one of two inputs of an OR gate 54.

The D1 signal from the output of the amplifier 30 (FIG.2) is coupled to the second input of the AND gate 53 and to one of two inputs of an OR gate 55. The output of the AND gate 52 is coupled to an inverting input of the OR gate 55 and to one of two input terminals of an OR gate 56. Similarly, the output of the AND gate 53 is coupled to an inverting input of the OR gate 54 and to one of two inputs of an OR gate 57. The output of the AND gate 55 is coupled to one of two inputs of an AND gate 58, and the output of the OR gate 54 is coupled to one of two inputs of an AND gate 59.

Override signals, identified herein as "FHS2DBUS" and "FHD2SBUS" are coupled to input terminals of gates 56 and 58 and 57 and 59, respectively. The output of the AND gate 58 is coupled to one of two inputs of a NAND gate 60. In a similar manner, the output of the AND gate 59 is coupled to one of two inputs of a NAND gate 61. The output of the OR gate 56 is coupled to one of two inputs of a NAND gate 62, and similarly the output of the OR gate 57 is coupled to one of two inputs of a NAND gate 63.

The output of the NAND gate 62 is coupled to the second input of the NAND gate 60 and in a similar fashion the output of the NAND gate 63 is coupled to the second input of the NAND gate 61. The output of the NAND gate supplies the DE signal, and is coupled to the second input of the NAND gate 62, to one of two inputs of an OR gate 70 and to the input of a delay circuit 71. Similarly, the output of the NAND gate 61 supplies the SE signal and is coupled to the second input of the NAND gate 63, to one of two inputs of an OR gate 72 and to a delay circuit 73. It is the function of the delay circuits 71 and 73 to prevent a race condition that could occur when making a transition from one signal format to the other.

The output of the delay circuit 73 is coupled to the second input of the OR gate 72. In a like manner, the output of the delay circuit 71 is coupled to the second input of the OR gate 70.

Figure 5A:
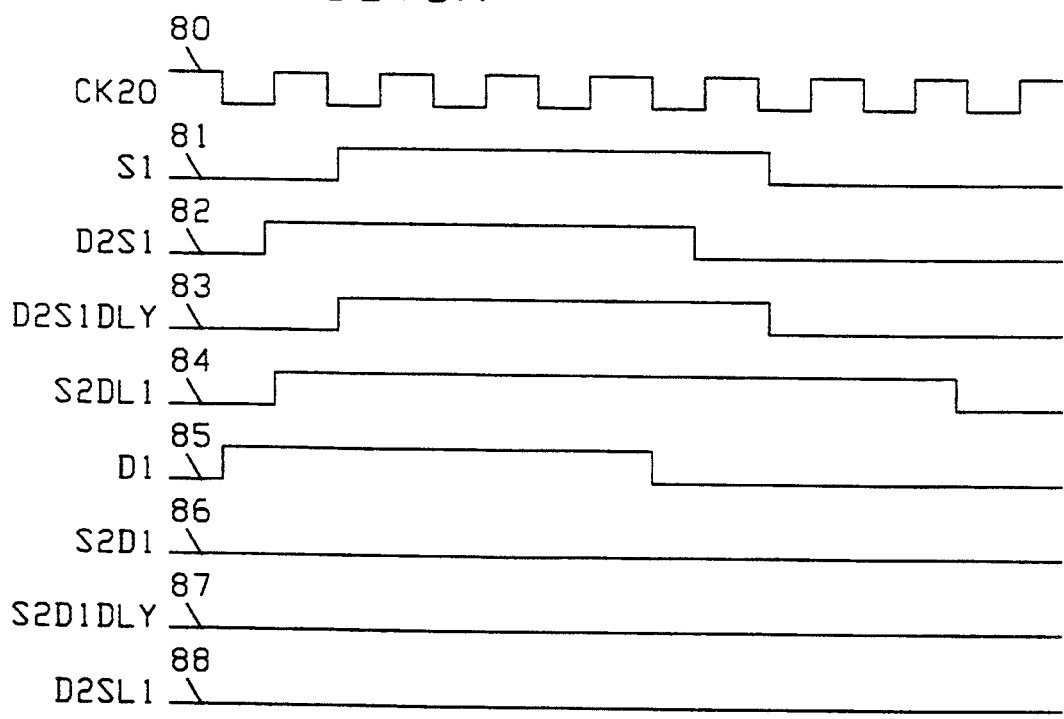
FIGS. 5A–5E are timing diagrams illustrating the operation of the present invention.

To more fully appreciate the operation of the present invention, reference is now made to the timing diagrams shown in FIGS. 5A–5E. FIG. 5A illustrates what happens when the differential signal arrives on nodes 21 and 22 (FIG. 1) before a single-ended signal arrives at node 20. To begin with, waveform 80 represents the clock (CK) signal, and waveform 81 represents the single-ended signal S1 appearing at the output of the inverter 25. Waveform 82 represents the output of the NAND gate 61 (FIG. 4), which is also the signal designated herein as SE. Recall that when the SE signal goes active, the NAND gate 32 (FIG. 1) is enabled and the differential signal appearing at the output of the amplifier 30 is passed through to the node 20 as a single-ended signal. Waveform 83 represents the output of the delay circuit 73, which signal is designated herein as D2S1DLY. Waveform 84 represents the output of the OR gate 50, and the signal here is referred to as S2DL1. As a result of the S2DL1 signal going high, the S2D1 or DE signal is forced inactive (waveform 86). This state is remembered for three clock cycles by the delay circuits 71 and 73. Thus, when the D1 input signal goes away (even though the S1 signal will remain active due to IC delays) the circuitry will not allow the S2D1 or DE1 signal to be activated.

Waveform 85 represents the differential signal D1 appearing at the output of the amplifier 30 (FIG. 2). Note that the positive transition occurs prior to the S1 signal (waveform 81). Waveforms 86, 87, and 88 represent the outputs of the NAND gate 60, the delay circuit 71 and the OR gate 51.

Figure 5B:
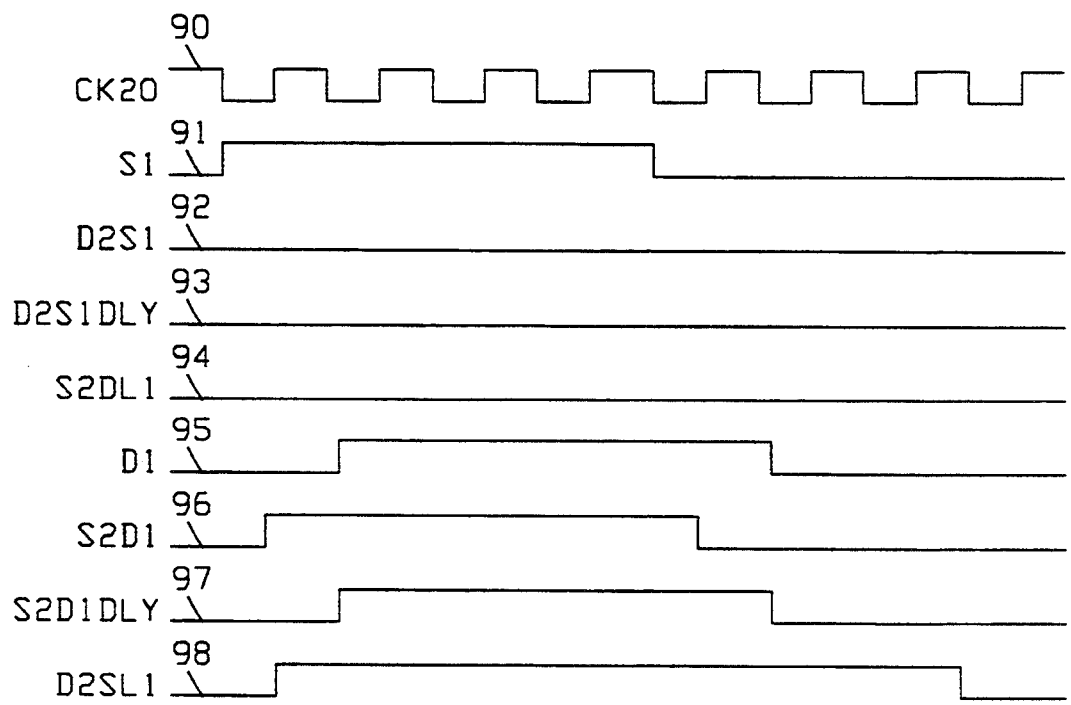

Referring now to FIG. 5B, the situation where the S1 signal arrives before the D1 signal is shown. Waveform 90 represents the clock and waveform 91 represents the S1 signal. Waveform 92 represents the D2S1 signal (output of the NAND gate 61) and waveform 93 represents the delayed version D2S1DLY (output of the delay circuit 71). Waveform 94 represents the S2DL1 signal (output of the OR gate 50) and waveform 95 represents the D1 signal. Waveform 96 represents the S2D1 signal at the output of the NAND gate 60 and is the result of the S1 signal going active. Waveform 97 represents the S2D1DLY signal appearing at the output of the delay circuit 73 as a result of the D2S1 signal going active. Finally, waveform 98 represents the D2SL1 signal appearing at the output of the OR gate 51.

As a result of the DE signal going active, the amplifier 28 (FIG. 1) is enabled and the single-ended signal (S1) is passed through the NAND gate 24 to the input of this amplifier. The signal appearing at the output of the amplifier 28 is in the differential format, which was converted from the single-ended format. Note that the D2S1 or SE signal remains inactive due to the S2DL1 being inactive.

Figure 5C:
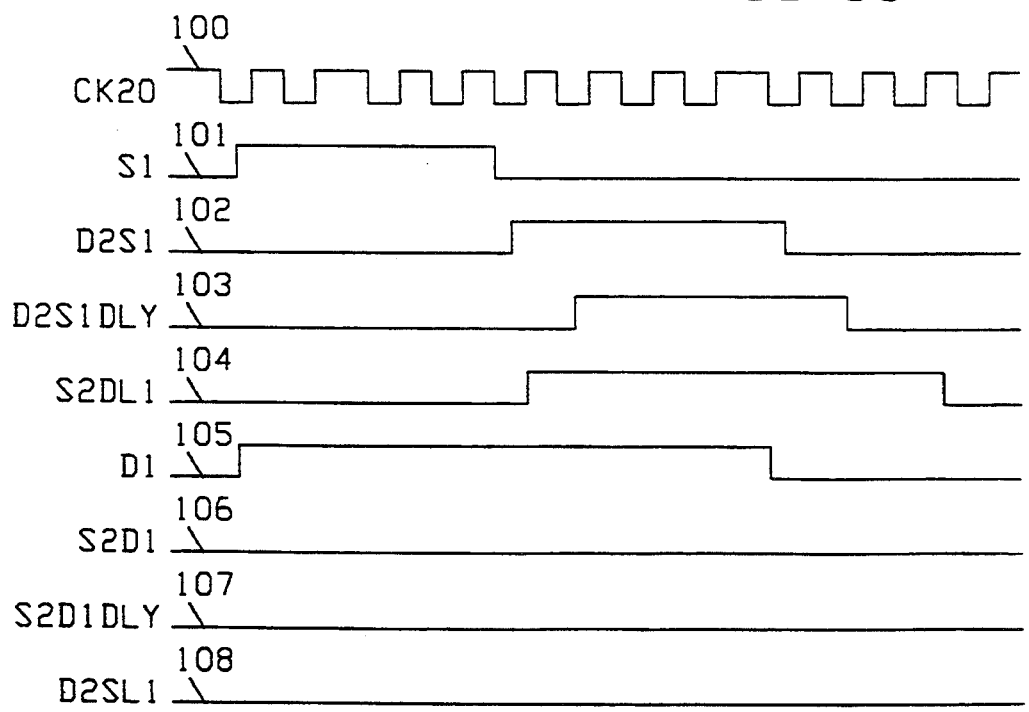
Figure 5D:
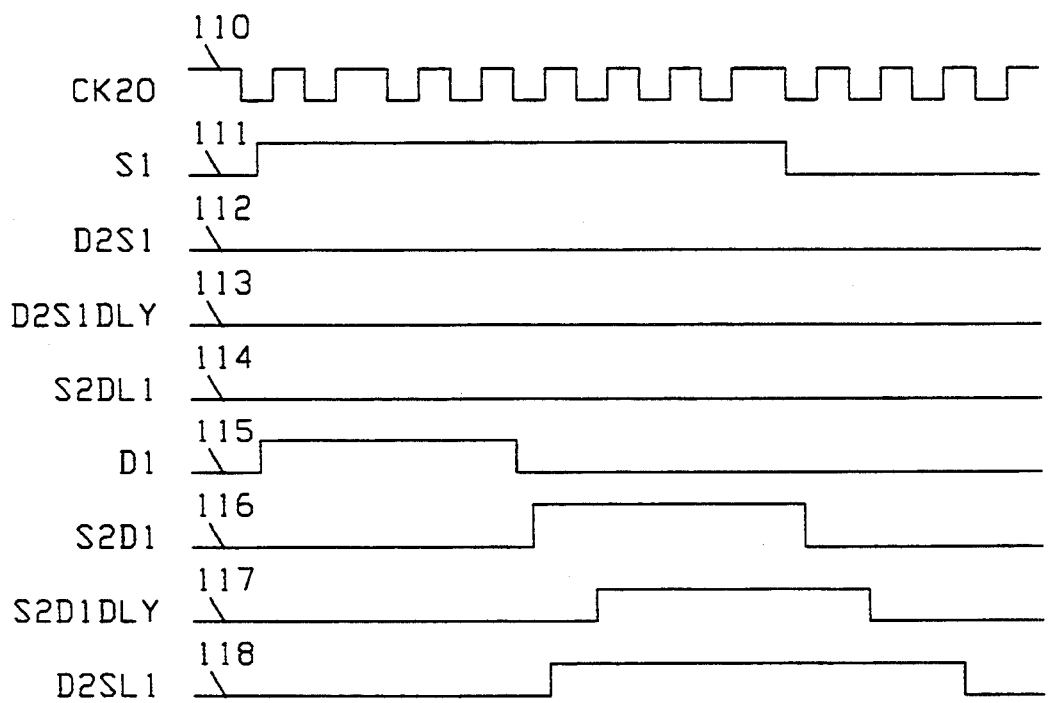

FIGS. 5C and 5D illustrate how the circuit of the present invention operates in the situation where the S1 and D1 signals arrive at the same time. In FIG. 5C, the S1 signal goes inactive before the D1 signals goes inactive, and in FIG. 5D the D1 signal goes inactive before the S1 signal goes inactive. Waveform 100 represents the clock signal, and waveform 101 represents the S1 signal. Waveforms 102 and 103 represent the D2S1 and D2S1DLY signals, respectively. Waveform 104 represents the S2DL1 signal and waveform 105 represents the D1 signal. Note that waveforms 101 and 105 go active at the same time, but waveform 101 goes inactive first.

Waveforms 106, 107 and 108 represent the S2D1, S2D1DLY and the D2SL1 signals, respectively; all of which are inactive in this scenario. Note that the D2S1 and S2D1 signals are inactive at the same time, which is desired in this situation. However, when the S1 signal goes inactive the D2S1 signal goes active, thereby converting the differential signal to a single-ended signal.

The situation shown in FIG. 5D is the same as shown in FIG. 5C, except that the D1 signal (waveform 115) goes inactive before the S1 signal (waveform 111) goes inactive. In this situation, the single-ended signal is converted to a differential signal as a function of the S2D1 or DE signal (waveform 116) going active.

Figure 5E:
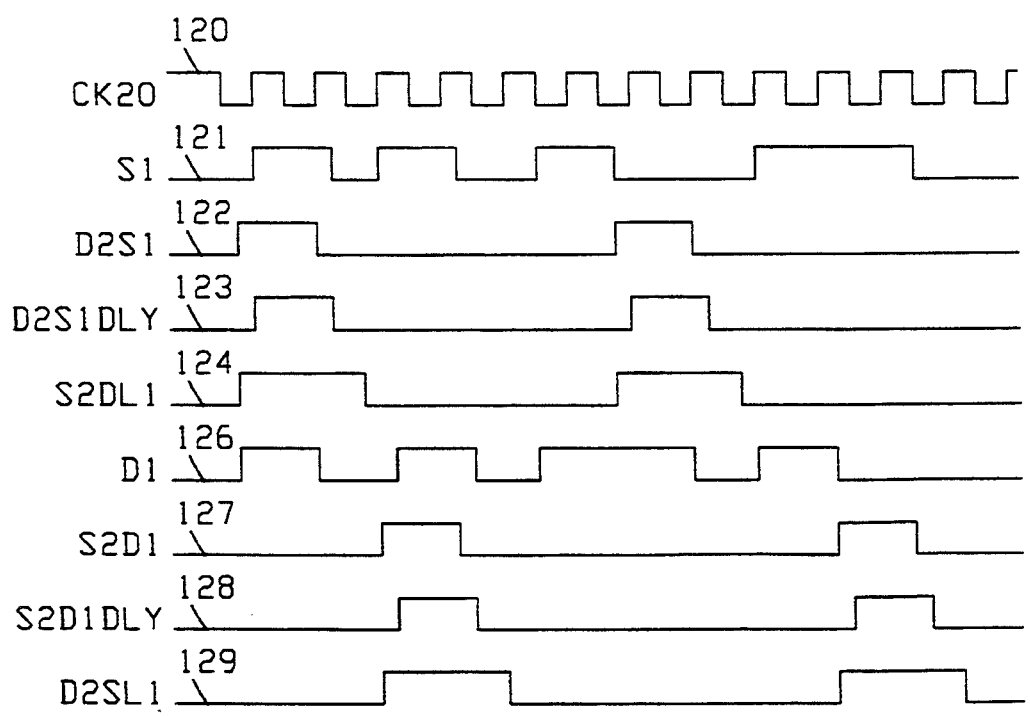

A summary of the above described operations is shown by the timing diagram of FIG. 5E.

Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. It is therefore contemplated that the appended claims will cover any such modifications of embodiments that fall within the true scope of the invention.

What is claimed is:

1. An apparatus for converting from a single-ended signal format to a differential signal format, and vice versa, having a driver/receiver disposed for detecting presence of a single-ended signal, and a differential transceiver disposed for detecting the presence of a differential signal, said apparatus comprising:
   a. a first binary cell having an output coupled to an enable input terminal of said driver/receiver;
   b. a second binary cell having an output coupled to an enable input terminal of said transceiver;
   c. first gating means responsive to both said single-ended signal and said differential signal for setting/resetting said first binary cell, said first gating means having an input terminal disposed for receiving an overriding signal for forcing conversion from a differential to a single-ended signal format and further including:

first circuit means responsive to said single-ended signal and being adapted to set said first binary cell when a single-ended signal is detected by said driver/receiver, and second circuit means responsive to said single-ended signal and being adapted to reset said second binary cell when a single-ended signal is detected by said driver/receiver means;

d. second gating means responsive to both said single-ended signal and said differential signal for setting/resetting said second binary cell, said second gating means having an input terminal disposed for receiving an overriding signal for forcing conversion from a single-ended to differential signal format and further including:

third circuit means responsive to said differential signal and being adapted to reset said first binary cell when a differential signal is detected by said transceiver means, and fourth circuit means responsive to said differential signal and being adapted to reset said first binary cell when a single-ended signal is detected by said driver/receiver means; and, e. a first time delay means disposed between the output of said first binary cell and an input of said second gating means and a second time delay means disposed between the output of said second binary cell and an input of said first gating means, said first and second time delay means being disposed for preventing a race condition to occur during the transition from converting from one signal format to another.

2. An apparatus as in claim 1 further including gating select means in said first and said second gating means for disabling the operation of said apparatus when an arbitration is not being made.

3. An apparatus as in claim 1 further including gating select means in said driver receiver means for disabling the passing of signals therethrough when an arbitration is not being made.

4. An apparatus as in claim 1 further including third gating means disposed for disabling both said first and said second binary cells when a single-ended signal is detected at the same time as a differential signal.

* * * * *